(12) United States Patent
Petit et al.

(10) Patent No.: US 12,233,757 B2
(45) Date of Patent: Feb. 25, 2025

(54) SLIDE RAIL LOCKING SYSTEM WITH CONTINUOUS ADJUSTMENT

(71) Applicant: FAURECIA Sièges d'Automobile, Nanterre (FR)

(72) Inventors: Fabrice Petit, Saint Georges des Groseillers (FR); Vincent Nardin, Flers (FR); Olivier Kircher, Saint Georges des Groseillers (FR); Dan Stoia, Stadthagen (DE)

(73) Assignee: FAURECIA Sièges d'Automobile, Nanterre (FR)

( * ) Notice: Subject to any disclaimer, the term of this patent is extended or adjusted under 35 U.S.C. 154(b) by 366 days.

(21) Appl. No.: 17/842,134

(22) Filed: Jun. 16, 2022

(65) Prior Publication Data
US 2022/0402405 A1 Dec. 22, 2022

(30) Foreign Application Priority Data
Jun. 21, 2021 (FR) ...................................... 2106553

(51) Int. Cl.
*B60N 2/08* (2006.01)

(52) U.S. Cl.
CPC ...................................... *B60N 2/08* (2013.01)

(58) Field of Classification Search
CPC ........ B60N 2/08; B60N 2/929; B60N 2/0702; B60N 2/0707; B60N 2/0727; B60N 2/12; B60N 2/0155
USPC ........ 296/65.13, 65.11, 65.14; 248/423, 424, 248/429; 297/344.1, 430
See application file for complete search history.

(56) References Cited

U.S. PATENT DOCUMENTS

| | | | | |
|---|---|---|---|---|
| 2,292,718 | A | | 8/1942 | Ryerson |
| 4,730,804 | A | * | 3/1988 | Higuchi ............... B60N 2/0825 297/344.1 |
| 11,059,391 | B2 | * | 7/2021 | Nishio ................. B60N 2/0881 |
| 2003/0227207 | A1 | | 12/2003 | Elio |
| 2007/0069099 | A1 | * | 3/2007 | Kohmura ............. B60N 2/0705 248/430 |
| 2007/0170743 | A1 | * | 7/2007 | Kinoshita ............ B60N 2/0818 296/65.13 |
| 2007/0284927 | A1 | * | 12/2007 | Therer ................... B60N 2/501 297/344.12 |

(Continued)

FOREIGN PATENT DOCUMENTS

| | | |
|---|---|---|
| CN | 207550003 U | 6/2018 |
| DE | 449476 A | 9/1927 |

(Continued)

OTHER PUBLICATIONS

French Search Report for French App. No. FR2106553 dated Feb. 25, 2022, 9 pages, No English Translation Available.

(Continued)

*Primary Examiner* — Amy R Weisberg
*Assistant Examiner* — Whitney Nicole Francis
(74) *Attorney, Agent, or Firm* — Barnes & Thornburg LLP (57) ABSTRACT

A system for locking a slide rail for a vehicle seat with continuous adjustment, comprises a fixed rail, and two blocking members urged towards each other by an elastic member to ensure their bracing on the rail, as well as to an unlocking mechanism comprising an unlocking member ensuring the release of the sliding of the slide rail by a separation of the two blocking members.

12 Claims, 6 Drawing Sheets

(56) References Cited

U.S. PATENT DOCUMENTS

| | | | | |
|---|---|---|---|---|
| 2011/0043027 A1* | 2/2011 | Hayahara | ................. | B60N 2/36 |
| | | | | 297/452.18 |
| 2013/0206952 A1* | 8/2013 | Yamada | ............... | B60N 2/0715 |
| | | | | 248/429 |
| 2015/0306979 A1* | 10/2015 | Hayashi | ................. | B60N 2/075 |
| | | | | 248/429 |
| 2016/0059739 A1* | 3/2016 | Tsuji | ...................... | B60N 2/682 |
| | | | | 248/429 |
| 2020/0238859 A1* | 7/2020 | Taniguchi | ............ | B60N 2/0818 |
| 2020/0238861 A1* | 7/2020 | Taniguchi | ............ | B60N 2/0705 |

FOREIGN PATENT DOCUMENTS

| | | |
|---|---|---|
| DE | 449476 A1 | 9/1927 |
| DE | 2301042 A1 | 7/1974 |
| DE | 7300781 U | 2/1977 |
| DE | 3613832 A1 | 10/1987 |
| DE | 19910029 A1 | 9/2000 |
| FR | 2907386 A1 | 4/2008 |

OTHER PUBLICATIONS

German Search Report for German App. No. 102022114341.4 dated Oct. 10, 2022, 7 pages.

* cited by examiner

SLIDE RAIL LOCKING SYSTEM WITH CONTINUOUS ADJUSTMENT

PRIORITY CLAIM

This application claims priority French Patent Application No. FR2106553, filed Jun. 21, 2021, which is expressly incorporated by reference herein.

BACKGROUND

The present disclosure relates to a locking system for a slide rail for a vehicle seat with continuous adjustment, as well as to a vehicle seat comprising such a locking system.

SUMMARY

According to the present disclosure, a slide rail locking system with continuous adjustment for a vehicle seat is proposed, the system comprising:
  the slide rail comprising a first, lower, slide rail element configured to be fixed to a floor of the vehicle, and a second, upper, slide rail element configured to slide along the first slide rail element and
  a system of locking by bracing, comprising:
    a rail, extending in length along the slide rail, fixed relative to the first slide rail element, the rail presenting a first, upper, friction surface, and an opposite second, lower, friction surface,
    a first blocking member and a second blocking member, mounted to be integral with the second slide rail element, with positions that are offset along a longitudinal axis of the rail, the first blocking member comprising a first wall and a facing second wall, configured to rub respectively along the first friction surface and the second friction surface of the rail, the second blocking member comprising a third wall and a facing fourth wall, configured to rub respectively along the first friction surface and the second friction surface of the rail,
    an elastic member mounted between the first blocking member and the second blocking member, generating a return force configured to urge the first blocking member and the second blocking member towards each other, with generation of a first force between the first blocking member and a first brace that is integral with the second slide rail element, and generation of a second force between the second blocking member
  and a second brace that is integral with the second slide rail element, and wherein the first force generated by the first brace on the first blocking member ensures bracing of the first blocking member on the rail, ensuring locking of the second slide rail element relative to the first slide rail element in a first direction, by two reactions of the rail on the first blocking member, with a first reaction between the first upper friction surface of the rail and the first wall of the first blocking member on the one hand, and a second reaction between the second lower friction surface of the rail and the second wall of the first blocking member on the other hand,
    and wherein the second force generated by the second brace on the second blocking member ensures bracing of the second blocking member on the rail, ensuring locking of the second slide rail element relative to the first slide rail element in a second direction, by two reactions of the rail on the second blocking member, with a third reaction between the first upper friction surface of the rail and the third wall of the second blocking member on the one hand, and a fourth reaction between the second lower friction surface of the rail and the fourth wall of the second blocking member on the other hand,
    an unlocking mechanism comprising a mobile unlocking member, configured to transition from a first position which allows bracing the first blocking member and second blocking member on the rail by the action of the elastic member, to a second position where the unlocking member separates the first blocking member and second blocking member against the return force of the elastic member, with release of the sliding of the second slide rail element relative to the first slide rail element.

In illustrative embodiments, the first slide rail element is a lower section and the second slide rail element is an upper section mounted so as to slide along the lower section, the first blocking member and the second blocking member extending inwardly into the interspace between the upper section and the lower section.

In illustrative embodiments, the first blocking member and the second blocking member project beyond the upper section, through two upper apertures of the upper section.

In illustrative embodiments, the rail is a part separate from the lower section, received in the interspace between the upper section and the lower section. A first bracket may connect a first longitudinal end of the rail with the lower section and a second bracket may connect a second end of the rail with the lower section.

In illustrative embodiments, the first blocking member and the second blocking member respectively comprise a first guide wall and a second guide wall, which face each other and are inclined relative to each other by converging towards the bottom, the first and second guide walls respectively configured to engage with the unlocking member during its deployment to ensure a separation of first blocking member and second blocking member against the return force of the elastic member, with elimination of the first force and of the second force, in the second position of the unlocking member.

In illustrative embodiments, and when the first brace and/or the second brace are elements separate from the second slide rail element, in particular the upper section, the system may comprise a mechanism for adjusting the position of the first brace and/or the second brace on the second slide rail element, along the longitudinal axis of the slide rail.

In illustrative embodiments, the first brace for the first blocking member and the second brace for the second blocking member are braces physically and directly formed by the second slide rail element, in particular by the upper section PSUP. For example, the first brace for the first blocking member consists of an edge of the upper aperture traversed by the first blocking member and the second brace for the second blocking member consists of an edge of the upper aperture traversed by the second blocking member.

In illustrative embodiments, the elastic member is a shaped strip spring, urged in extension, presenting a first longitudinal end bearing on a bearing surface of the first blocking member and a second longitudinal end bearing on a bearing surface of the second blocking member, and a section of intermediate length mainly extending along the longitudinal axis of the slide rail and joining the two ends consisting of the first longitudinal end and the second longitudinal end, the first longitudinal end and the second longitudinal end being oriented towards each other.

In illustrative embodiments, the slide rail extends in length along a direction X, and transversely along a direction Y, and in height along a direction Z, from bottom to top from the first slide rail element to the second slide rail element, and wherein the first blocking member and the second blocking member extend substantially along direction Z and wherein:

the areas where the forces generated by the elastic member are exerted on the first blocking member and on the second blocking member are arranged, along direction Z, below the first upper surface of the rail, the areas where the forces generated by the unlocking member are exerted on the first blocking member and on the second blocking member are arranged, along direction Z, below the first upper surface of the rail, the first brace generating the first force and the second brace generating the second force which ensure the bracing of the first blocking member and of the second blocking member, are arranged, along direction Z, above the first upper surface of the rail.

In illustrative embodiments, a motor vehicle seat comprises a seating portion and a backrest as well as a locking system with continuous adjustment according to the present disclosure, in which the first slide rail element is anchored to a floor of the vehicle and the second slide rail element is integral with a frame of the seating portion.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

The present disclosure relates to a slide rail locking system 1 with continuous adjustment for a vehicle seat, comprising; the slide rail 2 comprising a first slide rail element 20, lower, configured to be fixed to the floor of the vehicle, and a second slide rail element 21, upper, configured to slide along the first slide rail element, a system of locking by bracing.

The system of locking by bracing makes it possible to lock the slide rail continuously in an unlimited number of locking positions along the effective travel of the slide rail, in contrast to a discontinuous adjustment system comprising a limited number of locking positions.

The system of locking by bracing is self-contained in the sense that it is not an addition to a locking system of the discontinuous adjustment type, comprising notches ensuring such a discontinuous adjustment.

In the figures, the coordinate system XYZ is aligned such that the X axis is aligned along the sliding axis of the slide rail, the Y direction along the horizontal direction and transverse to the slide rail, perpendicular to X, and the Z axis along the vertical direction.

The first slide rail element 20 may be composed of a lower section PINF, presenting a section with a base 200 substantially extending along a plane parallel to the plane XY, extended by two ascending sides 201, 202. The second slide rail element 21 may be composed of an upper section PSUP, presenting a section with a principle side 210 substantially extending along a plane parallel to the plane XY, extended by two descending sides 211, 212. The end portions of ascending sides 201, 202 and the end portions of descending sides 211, 212 are interlocked and form runways for running gear, such as balls or similar elements.

Figure 1:
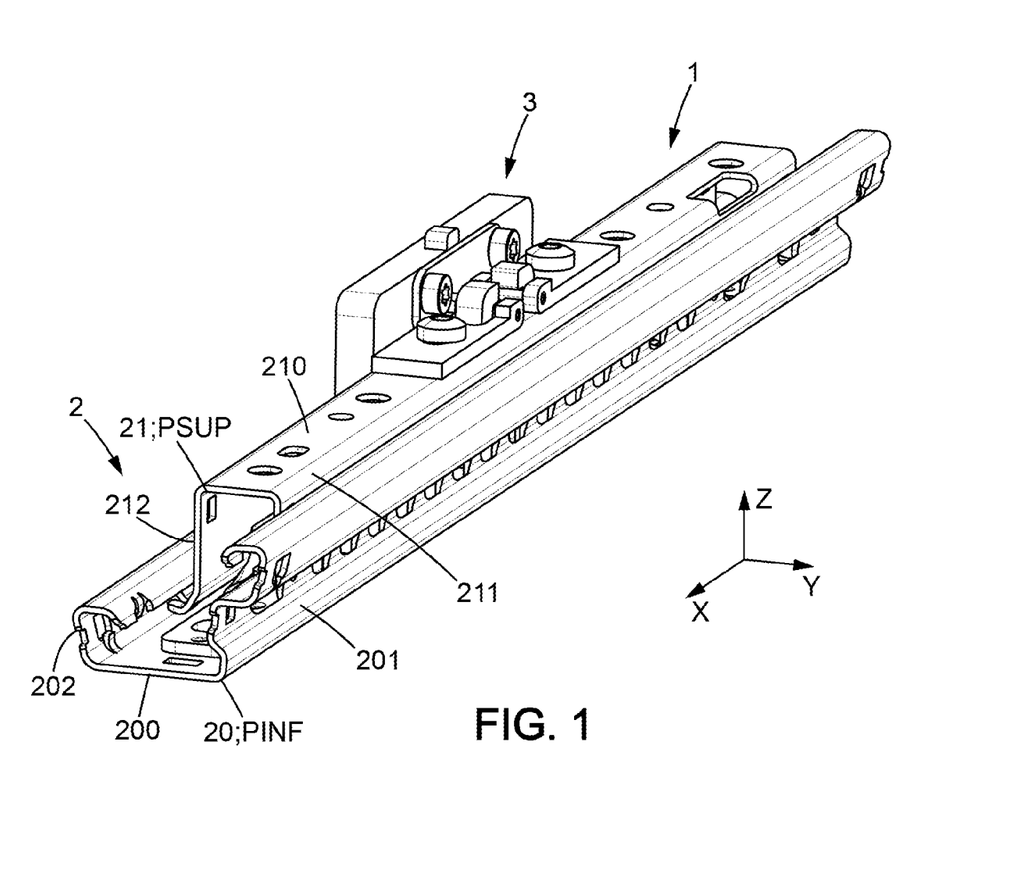
FIG. 1 shows a perspective view of a slide rail locking system with continuous adjustment.
Figure 2:
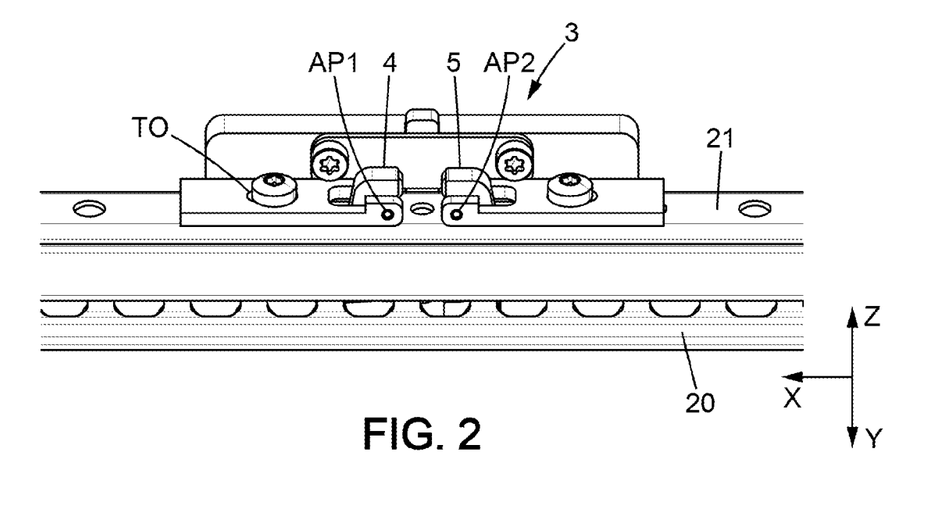
FIG. 2 is a detail view of FIG. 1, illustrating the locking system, including the first blocking member configured to engage with a first brace integral with the upper section of the slide rail, and a second blocking member configured to engage with a second brace integral with the upper section of the slide rail, the first brace being formed by a first transverse shaft integral with a first support, its position adjustable on the upper section along a first oblong aperture of the upper section, the second brace being formed by a second transverse shaft integral with a second support, its position adjustable on the upper section along a second oblong aperture of the upper section.
Figure 3:
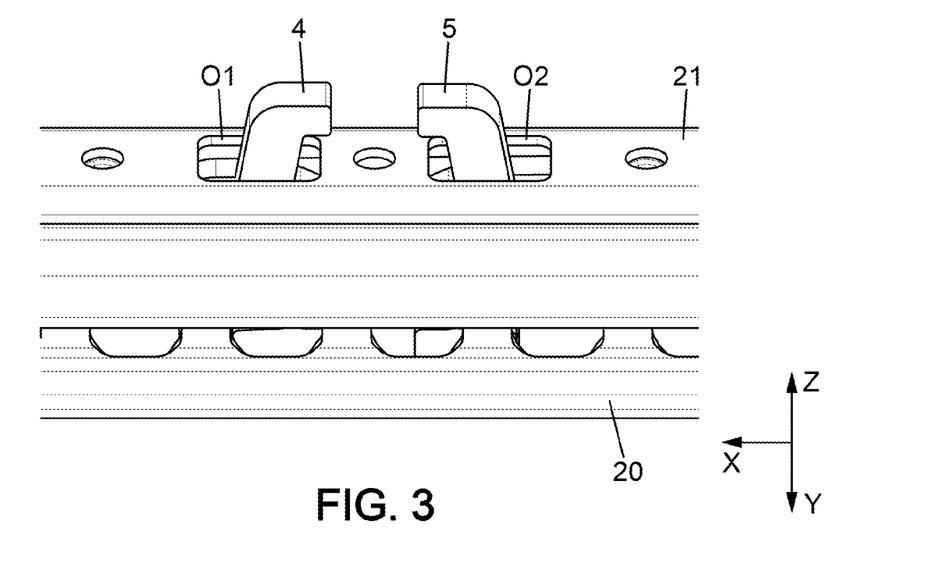
FIG. 3 is a view of FIG. 2 when the first support and the second support are removed, the first blocking member and the second blocking member projecting beyond the two apertures of the upper section.

FIG. 1 illustrates a slide rail with an asymmetrical profile, i.e. the vertical dimension of the two descending sides (respectively ascending) are unequal. In general, the present disclosure applies whether the upper and lower sections are asymmetrical as illustrated, or symmetrical (not illustrated).

According to the present disclosure, the system of locking by bracing comprises a rail 3, as well as a first blocking member 4 and a second blocking member 5 configured to be braced on the rail by the action of an elastic member 6.

Rail 3 extends along the slide rail and is fixed relative to the first slide rail element 20, the rail presenting a first upper friction surface 30, and an opposite second lower friction surface 31.

The first blocking member 4 and the second blocking member 5 are mounted integral with the second slide rail element 21, specifically mobile with it, their positions offset along a longitudinal axis of rail 3. The first blocking member 4 and the second blocking member 5 respectively extend in length along a vertical direction, direction Z, or are slightly inclined relative to this direction by a few degrees, by an angle of less than 25°, for example less than 10°.

First blocking member 4 comprises a first wall 40 and a second wall 41 facing the first wall, configured to rub respectively along the first friction surface 30 and the second friction surface 31 of the rail. First wall 40 and second wall 41 may be formed by two opposite side walls of a recess in the first blocking member, as illustrated in the figures.

Second blocking member 5 comprises a third wall 50 and a fourth wall 51 facing the third wall, configured to drag respectively along the first friction surface 30 and the second friction surface 31 of the rail 3. Third wall 50 and fourth wall 51 may be formed by two opposite side walls of a recess in the second blocking member 4, as illustrated in the figures.

Elastic member 6 is mounted between the first blocking member 4 and the second blocking member 5. Elastic member 6 generates a return force configured to urge the first blocking member 4 and the second blocking member 5 towards each other, with generation:
of a first force F1 between the first blocking member 4 and a first brace AP1 integral with the second slide rail element 21, the first force F1 being generated by the first brace on the first blocking member 4,
a second force F2 between the second blocking member 5 and a second brace AP2 integral with the second slide rail element 21, the second force F2 being generated by the second brace on the first blocking member 4, As illustrated in FIG. 7a, the first force F1 generated by the first brace AP1 on the first blocking member 4 ensures bracing of the first blocking member 4 on rail 3, ensuring locking of the second slide rail element relative to the first slide rail element, in a first direction 51 (of sliding of the slide rail).

This locking in direction 51 is obtained by bracing with two reactions of the rail on the first blocking member, with a first reaction $R_{A1}$ between the first upper friction surface 30 of the rail and the first wall 40 of the first blocking member 4 on the one hand, and a second reaction $R_{B1}$ between the second lower friction surface 31 of the rail and the second wall 41 of the first blocking member 4 on the other hand.

In particular, and as visible in FIG. 1, the point where the first force F1 generated by the first brace AP1 is applied on the first blocking member 4 is located above the point of intersection CP1 of the directions of the first and second reactions $R_{A1}$, $R_{B1}$ along direction Z, or above dotted line L1, which provides the bracing of the first blocking member 4 on the rail 3.

Figure 7A:
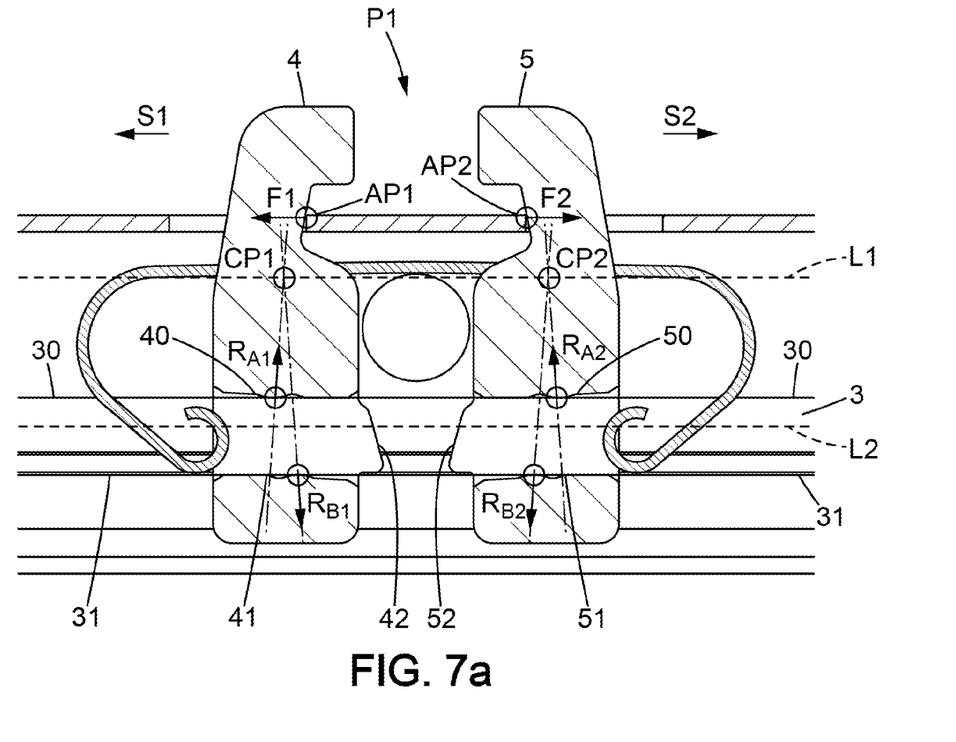
FIG. 7*a* is a schematic view illustrating the principle and conditions of the locking by bracing of the locking system, with bracing of the first blocking member on the rail to ensure blocking of the slide rail in a first sliding direction, and bracing of the second blocking member on the rail to ensure blocking of the slide rail in the second sliding direction.

As illustrated in FIG. 7a, the second force F2 generated by the second brace AP2 on the second blocking member 5 ensures bracing of the second blocking member 5 on rail 3, ensuring locking of the second slide rail element 21 relative to the first slide rail element 20, in a second direction S2 (of sliding of the slide rail).

This locking in direction S2 is obtained by bracing with two reactions of the rail on the second blocking member 5, with a third reaction $R_{A2}$ between the first upper friction surface 30 of the rail and the third wall 50 of the second blocking member 5 on the one hand, and a fourth reaction $R_{B2}$ between the second lower friction surface 31 of the rail and the fourth wall 51 of the second blocking member 5 on the other hand.

In particular, and as is visible in FIG. 7a, the point of application of the second force F2 generated by the second brace AP2 on the second blocking member is located above the point of intersection CP2 of the directions of the third and fourth reactions $R_{A2}$, $R_{B2}$ along direction Z, or above dotted line L1, which provides the bracing of the second blocking member 5 on the rail 3.

One will also note that the first brace AP1 generating the first force F1 and the second brace AP2 generating the second force F2, ensuring the bracing of the first blocking member 4 and the second blocking member 5, are arranged along direction Z, above the first upper surface 30 of the rail. The braces (first brace AP1 and second brace AP2) may be located, along direction Z, near the principle side 210 of the upper section PSUP.

One will also note in FIG. 7a that the areas where the two forces $F_{Spring}$ generated by the elastic member 6 are exerted on the first blocking member 4 and on the second blocking member 5 are arranged, along direction Z, preferably below the first upper surface 30 of the rail.

The elastic member 6 may be a shaped strip spring, urged in extension, presenting:
a first longitudinal end 60 bearing on a bearing surface of the first blocking member 4, and,
a second longitudinal end 61 bearing on a bearing surface of the second blocking member 5, and,
a section of intermediate length mainly extending along the longitudinal axis of the slide rail and joining the two ends consisting of the first longitudinal end 60 and the second longitudinal end 61.

Figure 7B:
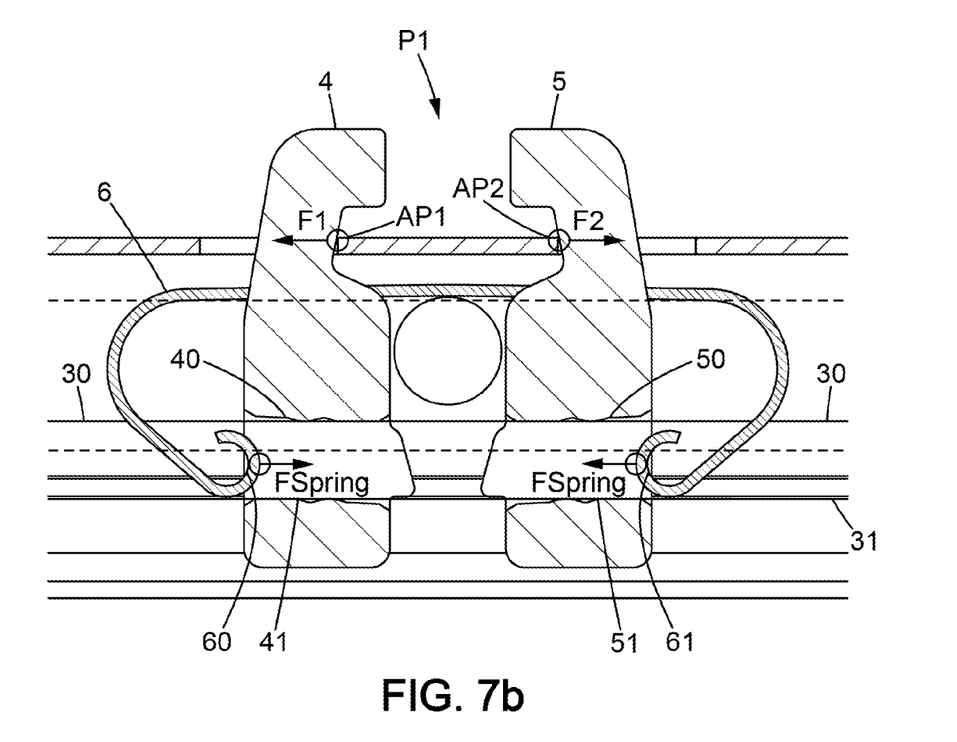
FIG. 7*b* is a view according to FIG. 7*a* illustrating the points where forces generated by the elastic member are applied on the first blocking member and on the second blocking member, the elastic member causing the generation of a first force between the first blocking member and the first brace that is integral with the second slide rail element, and the generation of a second force between the second blocking member and a second brace that is integral with the second slide rail element, bracing the two blocking members.

The first longitudinal end 60 and the second longitudinal end 61 are oriented towards each other, as illustrated in FIG. 7b.

The locking system with continuous adjustment also comprises an unlocking mechanism comprising a mobile unlocking member 7, configured to transition from a first position P1 enabling bracing of the first blocking member 4 and bracing of the second blocking member 5 on rail 3 by the action of the elastic member 6, to a second position P2 moving apart the first blocking member 4 and the second blocking member 5 against the return force of the elastic member 6.

The second position P2 of the unlocking member ensures the separation between the first blocking member 4 and the second blocking member 5 until the elimination of the first force F1 and second force F2, as well as the release of the sliding of the second slide rail element 21 relative to the first slide rail element 20.

Figure 7C:
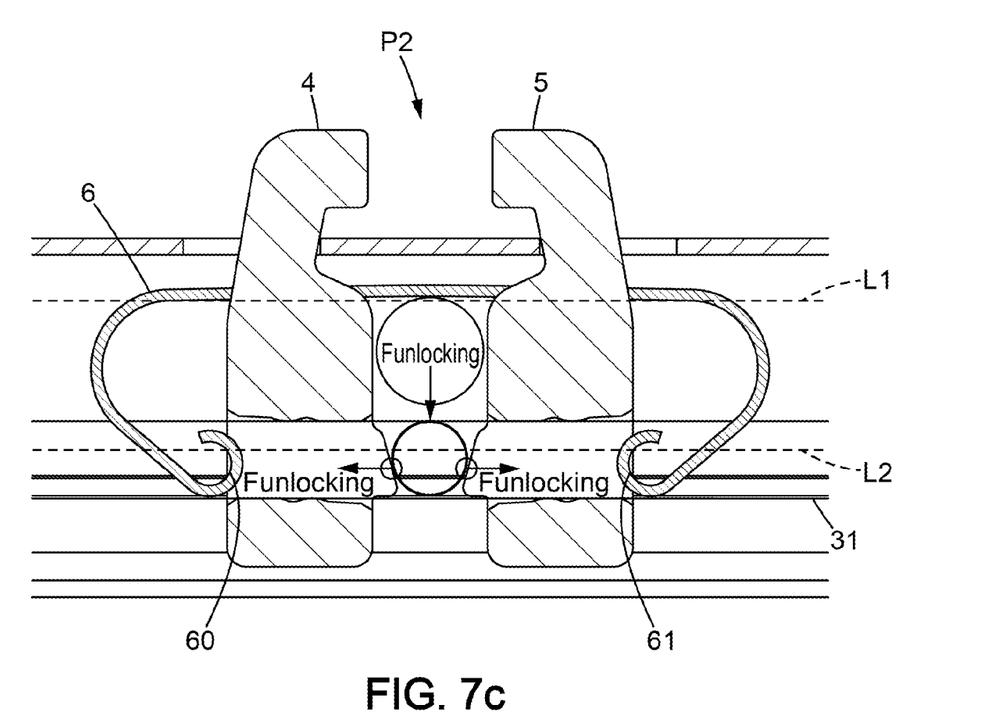
FIG. 7*c* is a schematic view illustrating the points of application of the unlocking member on two guide walls of two blocking members, the guide walls being inclined relative to each other in order to move apart the two blocking members, and thus eliminate the bracing and release the sliding of the slide rail.

In FIG. 7c, one will note that the areas where the forces $F_{unlocking}$ generated by the unlocking member 7 are exerted on the first blocking member 4 and on the second blocking member 5 are arranged, along direction Z, below the first upper surface 30 of the rail, and preferably below dotted line L2.

For this purpose, the first blocking member 4 and the second blocking member 5 may respectively comprise a first guide wall 42 and a second guide wall 52 facing the first wall, inclined relative to each other by converging from the second slide rail element 21 towards the first slide rail element 20, specifically downward along the vertical direction Z.

This first guide wall 42 and this second guide wall 52 are respectively configured to engage with the unlocking member 7 during its deployment in order to separate the first blocking member 4 and the second blocking member 5 against the return force of the elastic member 6, with elimination of the first force F1 and second force F2 in the second position P2 of the unlocking member 7.

Figure 4A:
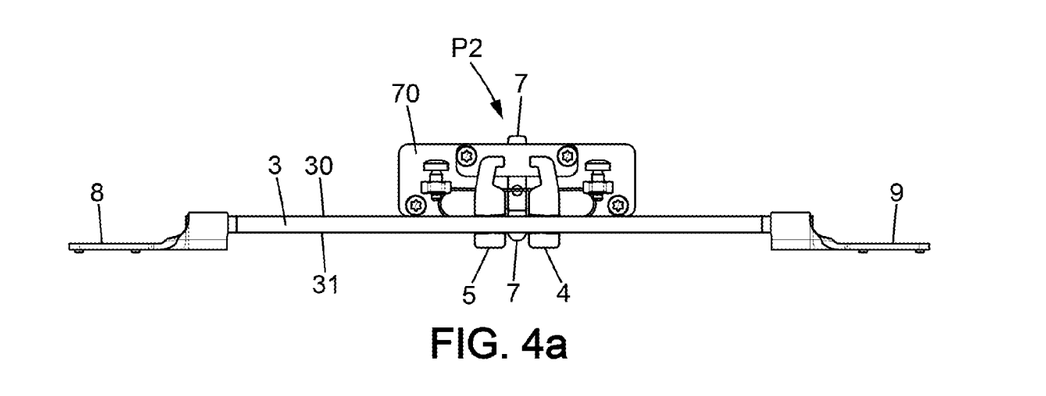
FIG. 4*a* is a view of the system when the upper section and the lower section of the slide rail are hidden, leaving visible the internal rail with brackets, as well as the mechanism comprising the first blocking member and the second blocking member, one urged towards the other by the elastic member in the form of an extended spring, an unlocking member being inserted between the two blocking members and moving them apart to unlock the slide rail in a second position of the unlocking member.
Figure 4B:
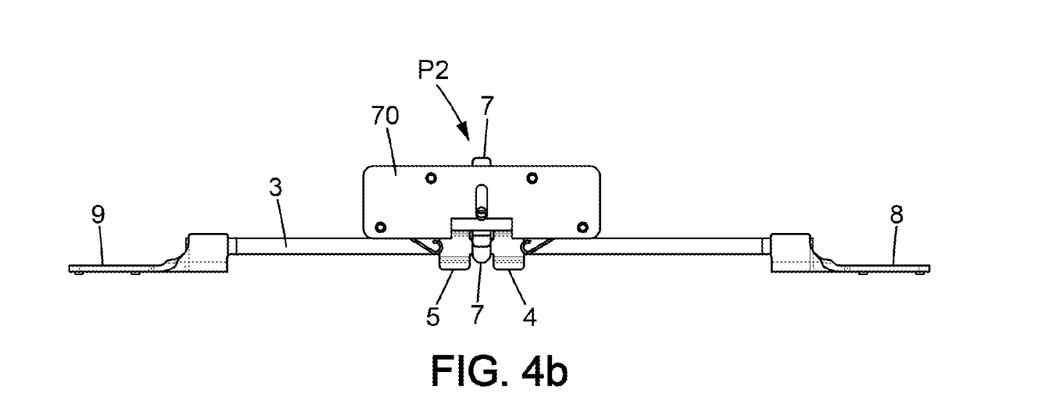
FIG. 4*b* is a back view of FIG. 4*a*.
Figure 5:
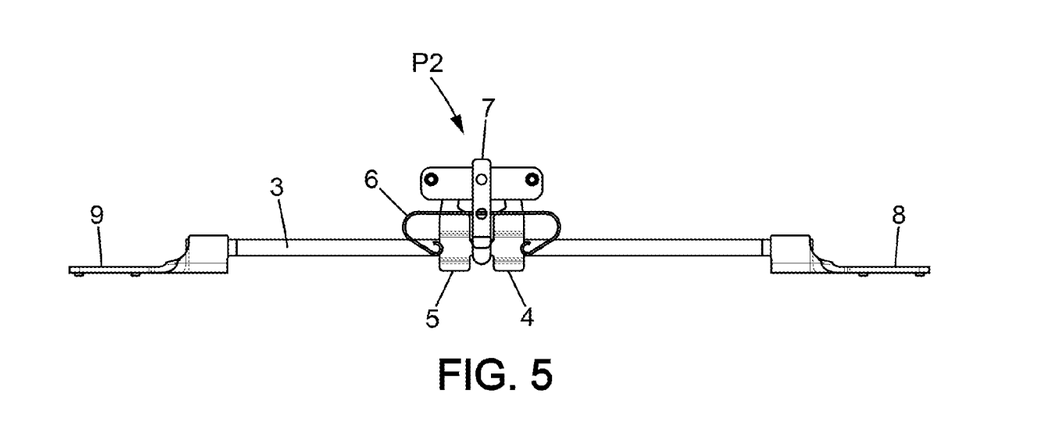
FIG. 5 is a partial view of FIG. 4*b* when a support with a guide function for the unlocking member is hidden.

In FIGS. 4a and 4b, the unlocking member 7 is a finger slidingly mounted on a support 70 that is in the high position in the unlocking position P1 and low in the locking position P2. From the high position to the low position, the finger is inserted between the first guide wall 42 and the second guide wall 52, by engaging with the guide walls 42,52 (first and second). Conversely, from the low position to the high position, the digit is removed so as to allow the elastic member 6 to work freely.

The transition of the unlocking member from the first position P1 to the second position P2 (and conversely) may be mechanized, obtained by an actuator, or may be manual.

According to one embodiment, the first blocking member 4 and the second blocking member 5 project beyond the upper section, respectively through two upper apertures O1, O2 of the upper section PSUP.

In addition, rail 3 may be a part separate from the lower section 20, received in the interspace between the upper section PSUP and the lower section PINF. Rail 3 is fixed to the lower section PINF by brackets. A first bracket 8 connects a first longitudinal end of the rail to the lower section and a second fixation rail 9 connects a second end of the rail to the lower section PINF.

One will note that the slide rail locking system may comprise a mechanism for adjusting the position of the first brace AP1 and/or of the second brace AP2, on the second slide element, in particular the upper section PSUP, along the longitudinal axis of the slide rail 2. In such a case, this makes it necessary to provide the first brace AP1 and/or the second brace AP2 as separate elements from the second slide element 21, in particular separate from the upper section PSUP.

Figure 6:
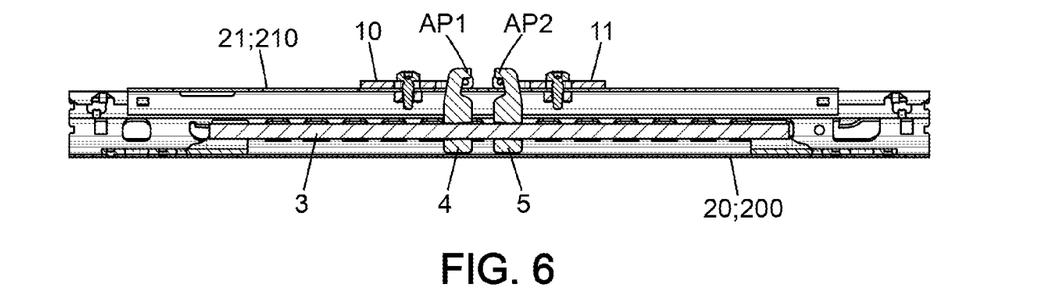
FIG. 6 is a cross-sectional view along a plane parallel to the XY plane, passing through the internal rail between the upper and lower sections of the slide rail.

In FIG. 6, one will note that the first brace AP1 is in the form of a transverse shaft, aligned along direction Y, which is integral with a support 10 that is in an adjustable position on the upper section PSUP. One will note that the second brace AP2 is in the form of a transverse shaft, aligned along direction Y, which is integral with a support 11 that is in an adjustable position on the upper section PSUP.

The adjustment is carried out, for example, by clamping a fixation member (for example, a screw/nut system) through an oblong aperture TO on support 10 or 11, or else on the upper section PSUP.

In general, the first brace AP1 and/AP2 may be composed of separate elements of the second slide rail element 21, particularly of the upper section, even when they are not in an adjustment position along the second slide rail element 21. First brace AP1 may be integral with support 10 (first) and second brace AP2 may be integral with support 11 (second). Integrally securing supports 10 and 11 to the second slide rail element 21, particularly to the upper section PSUP, can be achieved by any means such as a screw-nut system, rivets, or by welding.

Alternatively, the first brace AP1 for the first blocking member 4 and the second brace AP2 for the second blocking member 5 are braces physically and directly formed by the upper section PSUP.

For example, the first brace AP1 for the first blocking member 4 may be formed by an edge of the upper aperture O1 traversed by the first blocking member 4 and the second brace AP2 for the second blocking member is formed by an edge of the upper aperture O2 traversed by the second blocking member 5.

Rail 3 may be parallelepipedal, of rectangular cross-section, the first friction surface 30 and the second friction surface 31 composed of two opposite faces of the parallelepiped. However, rail 3 is not limited to this shape and may, for example, be cylindrical in shape, of circular cross-section.

The present disclosure also relates to a motor vehicle seat comprising a seating portion and a backrest as well as one (or even two) locking system(s) with continuous adjustment according to the present disclosure, in which the first slide rail element 20 is anchored to a floor of the vehicle and the second slide rail element 21 is integral with a frame of the seating portion.

In one example, the seat may have two slide rail locking systems 1 arranged in parallel.

The present disclosure relates to a locking system for a slide rail for a vehicle seat with continuous adjustment, as well as to a vehicle seat comprising such a locking system.

The present disclosure falls within the field of slide rail adjustment and locking systems for motor vehicles. It more specifically relates to adjustment systems in which the slide rails connect a seating portion of the seat to the floor of the vehicle.

In the present disclosure, a vehicle seat may typically comprise:
  a seating portion, that extends along a direction X, from
    a front edge and to a rear edge, and extends transversely
    along a direction Y, from a first lateral edge to a second
    lateral edge,
  a backrest that extends in height from the rear edge of the
    seating portion, along a vertical direction Z, or inclined
    typically rearward, from a lower edge to an upper edge
    of the backrest, and extends transversely along a direction Y, from a first lateral edge to a second lateral edge.

The backrest may be reclinable relative to the seating portion, for example, on a pivot axis between the backrest frame and the seating portion frame, extending along the transverse direction Y.

The position of the seat in the vehicle may be adjusted, along the direction X, by using an adjustment and locking system according to the present disclosure, or even preferably two adjustment and locking systems, with two slide rails connecting in parallel the seating portion to the floor of the vehicle.

Therefore, the slide rail or each of the two slide rails comprises two slide rail elements with a first slide rail element integral with the floor, typically a lower section, and a second slide rail element integral with the seating portion of the seat, typically an upper section, the two slide rail elements being configured to slide relative to each other along the X direction.

The adjustment and locking system also comprises a lock system, including a control member that is operated, typically manually or in a power-operated manner, to unlock the slide rail so as to enable the seat occupant to adjust the position of the seat by displacing the first slide rail element, which is mobile, relative to the second slide rail element.

Once the position of the seat is adjusted, the control member is released to ensure locking of the seat in adjustment positions corresponding to incremental adjustments of the slide rail.

For this purpose, comparative locking systems with discontinuous adjustment that present a lock system comprising a support, integral with the second slide rail element, and blocking members, mobile relative to the support, configured to penetrate into adjustment apertures integral with the first slide rail element in a locking state of the lock system, under the action of elastic means such as springs. The control member, when activated, enables the blocking members to be urged against the force from the springs and thereby to withdraw the blocking members from the adjustment apertures, releasing the sliding of the slide rail.

A comparative first lock system family, sometimes designated by the term "step lock", for which the blocking members, typically integral with each other, only block the slide rail if the relative position between the two slide rail elements, first slide rail element and second slide rail element, corresponds to an adjustment increment of the slide rail.

A comparative second lock system family, of improved safety compared to the first comparative family, sometimes designated by the term "instant lock", which always blocks the two slide rail elements even if the position between the two slide rail elements, first slide rail element and second slide rail element, is in any intermediate position between two consecutive adjustment positions.

For this purpose, the comparative blocking members are independent from each other and are configured such that at least one of the members penetrates and catches in one of the adjustment apertures, typically oblong, even if the slide rail is in this any intermediate position between two adjustment increments, i.e. two consecutive adjustment positions of the slide rail.

The comparative slide rail can then only slide over a course corresponding to the adjustment increment of the slide rail. A slight sliding of the first slide rail element relative to the second slide rail element enables the two non-penetrating blocking members to face each other and be locked in the adjustment apertures when the slide rail is displaced in one (or the other) of the two consecutive adjustment positions, in order to obtain locking of the slide rail. In the two cases, whether the lock system is of the "step lock" type or of the "instant lock" type, the number of adjustment positions is limited to the number of locking positions permitted by the adjustment increment of the system.

However, the present disclosure concerns the slide rail locking system with continuous adjustment, i.e. which provides an unlimited number of adjustment positions along the length of the slide rail, and with continuous adjustment, in contrast to the adjustment and the comparative locking system previously described.

A comparative slide rail comprises an upper section mounted so as to slide along a lower section. The lower section of the slide rail comprises a vertical fold projecting into the interspace between the two sections, the fold extending along a median vertical plane, this fold forming two friction surfaces, substantially vertical.

Two pairs of friction members are provided in the comparative slide rail, one on either side of the vertical fold, including:
    a first pair of friction members, extending between one of the friction surfaces of the vertical fold and a wall opposite the upper section, a first elastomer block thus urging the two members of the pair to separate to ensure bracing,
    a second pair of friction members extending between the other of the friction surfaces of the vertical fold and another wall opposite the upper section, a second elastomer block thus urging the two members of the pair to separate to ensure bracing.

Unlocking is obtained by a mechanism comprising a fork, for each pair of friction members, which makes it possible to unbrace the pair by simultaneously bringing the two blocking members of each pair closer together.

Such comparative locking mechanism with continuous adjustment has a great number of parts, and a structure that is costly to manufacture. Such an adjustment and locking system can be improved.

The present disclosure aims to improve the situation as compared to the comparative locking systems.

A slide rail locking system with continuous adjustment for a vehicle seat is proposed, the system comprising:
    the slide rail comprising a first, lower, slide rail element configured to be fixed to a floor of the vehicle, and a second, upper, slide rail element configured to slide along the first slide rail element,
    a system of locking by bracing, comprising:
        a rail, extending in length along the slide rail, fixed relative to the first slide rail element, the rail presenting a first, upper, friction surface, and an opposite second, lower, friction surface
        a first blocking member and a second blocking member, mounted to be integral with the second slide rail element, with positions that are offset along a longitudinal axis of the rail, the first blocking member comprising a first wall and a facing second wall, configured to rub respectively along the first friction surface and the second friction surface of the rail, the second blocking member comprising a third wall and a facing fourth wall, configured to rub respectively along the first friction surface and the second friction surface of the rail,
        an elastic member mounted between the first blocking member and the second blocking member, generating a return force configured to urge the first blocking member and the second blocking member towards each other, with generation of a first force between the first blocking member and a first brace that is integral with the second slide rail element, and generation of a second force between the second blocking member and a second brace that is integral with the second slide rail element,
    and wherein the first force generated by the first brace on the first blocking member ensures bracing of the first blocking member on the rail, ensuring locking of the second slide rail element relative to the first slide rail element in a first direction, by two reactions of the rail on the first blocking member, with a first reaction between the first upper friction surface of the rail and the first wall of the first blocking member on the one hand, and a second reaction between the second lower friction surface of the rail and the second wall of the first blocking member on the other hand,
    and wherein the second force generated by the second brace on the second blocking member ensures bracing of the second blocking member on the rail, ensuring locking of the second slide rail element relative to the first slide rail element in a second direction, by two reactions of the rail on the second blocking member, with a third reaction between the first upper friction surface of the rail and the third wall of the second blocking member on the one hand, and a fourth reaction between the second lower friction surface of the rail and the fourth wall of the second blocking member on the other hand,
    an unlocking mechanism comprising a mobile unlocking member, configured to transition from a first position which allows bracing the first blocking member and second blocking member on the rail by the action of the elastic member, to a second position where the unlocking member separates the first blocking member and second blocking member against the return force of the elastic member, with release of the sliding of the second slide rail element relative to the first slide rail element.

The features specified in the following paragraphs may, optionally, be implemented. The features may be implemented independently from each other or in combination with each other:

According to one embodiment, the first slide rail element is a lower section and the second slide rail element is an upper section mounted so as to slide along the lower section, the first blocking member and the second blocking member extending inwardly into the interspace between the upper section and the lower section.

According to one embodiment, the first blocking member and the second blocking member project beyond the upper section, through two upper apertures of the upper section.

According to one embodiment, the rail is a part separate from the lower section, received in the interspace between the upper section and the lower section. A first bracket may connect a first longitudinal end of the rail with the lower section and a second bracket may connect a second end of the rail with the lower section.

According to one embodiment, the first blocking member and the second blocking member respectively comprise a first guide wall and a second guide wall, which face each other and are inclined relative to each other by converging towards the bottom, the first and second guide walls respectively configured to engage with the unlocking member during its deployment to ensure a separation of first blocking member and second blocking member against the return force of the elastic member, with elimination of the first force and of the second force, in the second position of the unlocking member.

According to one embodiment, and when the first brace and/or the second brace are elements separate from the second slide rail element, in particular the upper section, the system may comprise a mechanism for adjusting the position of the first brace and/or the second brace on the second slide rail element, along the longitudinal axis of the slide rail.

Alternatively, the first brace for the first blocking member and the second brace for the second blocking member are braces physically and directly formed by the second slide rail element, in particular by the upper section PSUP. For example, the first brace for the first blocking member consists of an edge of the upper aperture traversed by the first blocking member and the second brace for the second blocking member consists of an edge of the upper aperture traversed by the second blocking member.

According to one embodiment, the elastic member is a shaped strip spring, urged in extension, presenting a first longitudinal end bearing on a bearing surface of the first blocking member and a second longitudinal end bearing on a bearing surface of the second blocking member, and a section of intermediate length mainly extending along the longitudinal axis of the slide rail and joining the two ends consisting of the first longitudinal end and the second longitudinal end, the first longitudinal end and the second longitudinal end being oriented towards each other.

According to one embodiment, the slide rail extends in length along a direction X, and transversely along a direction Y, and in height along a direction Z, from bottom to top from the first slide rail element to the second slide rail element, and wherein the first blocking member and the second blocking member extend substantially along direction Z and wherein:

the areas where the forces generated by the elastic member are exerted on the first blocking member and on the second blocking member are arranged, along direction Z, below the first upper surface of the rail, the areas where the forces generated by the unlocking member are exerted on the first blocking member and on the second blocking member are arranged, along direction Z, below the first upper surface of the rail, the first brace generating the first force and the second brace generating the second force which ensure the bracing of the first blocking member and of the second blocking member, are arranged, along direction Z, above the first upper surface of the rail.

According to a second aspect, the present disclosure relates to a motor vehicle seat comprising a seating portion and a backrest as well as a locking system with continuous adjustment according to the present disclosure, in which the first slide rail element is anchored to a floor of the vehicle and the second slide rail element is integral with a frame of the seating portion.

The invention claimed is:

1. A slide rail locking system with continuous adjustment for a vehicle seat, comprising;
  a slide rail comprising a first, lower, slide rail element configured to be fixed to a floor of the vehicle, and a second, upper, slide rail element configured to slide along the first slide rail element and
  a system of locking by bracing, comprising:
    a rail, extending in length along the slide rail, fixed relative to the first slide rail element, the rail presenting a first, upper, friction surface, and an opposite second, lower, friction surface,
    a first blocking member and a second blocking member, mounted to be integral with the second slide rail element, with positions that are offset along a longitudinal axis of the rail, the first blocking member comprising a first wall and a facing second wall, configured to rub respectively along the first friction surface and the second friction surface of the rail, the second blocking member comprising a third wall and a facing fourth wall, configured to rub respectively along the first friction surface and the second friction surface of the rail,
    an elastic member mounted between the first blocking member and the second blocking member, generating a return force configured to urge the first blocking member and the second blocking member towards each other, with generation of a first force between the first blocking member and a first brace integral with the second slide rail element, and generation of a second force between the second blocking member and a second brace integral with the second slide rail element,
  and wherein the first force generated by the first brace on the first blocking member ensures bracing of the first blocking member on the rail, ensuring locking of the second slide rail element relative to the first slide rail element in a first sliding direction, by two reactions of the rail on the first blocking member, with a first reaction between the first upper friction surface of the rail and the first wall of the first blocking member on the one hand, and a second reaction between the second lower friction surface of the rail and the second wall of the first blocking member on the other hand, and wherein the second force generated by the second brace on the second blocking member ensures bracing of the second blocking member on the rail, ensuring locking of the second slide rail element relative to the first slide rail element in a second sliding direction, by two reactions of the rail on the second blocking member, with a third reaction between the first upper friction surface of the rail and the third wall of the second blocking member on the one hand, and a fourth reaction between the second lower friction surface of the rail and the fourth wall of the second blocking member on the other hand, an unlocking mechanism comprising a mobile unlocking member, configured to transition from a first position which allows bracing the first blocking member and second blocking member on the rail by the action of the elastic member, to a second position where the unlocking member separates the first blocking member and second blocking member against the return force of the elastic member, with release of the sliding of the second slide rail element relative to the first slide rail element.

2. The slide rail locking system of claim 1, wherein the first slide rail element is a lower section and the second slide rail element is an upper section, mounted so as to slide along the lower section, the first blocking member and the second blocking member extending inwardly into the interspace between the upper section and the lower section.

3. The slide rail locking system of claim 2, wherein the first blocking member and the second blocking member project beyond the upper section, through two upper apertures of the upper section.

4. The slide rail locking system of claim 2, wherein the rail is a part separate from the lower section, received in the interspace between the upper section and the lower section.

5. The slide rail locking system of claim 4, wherein a first bracket connects a first longitudinal end of the rail with the lower section and a second bracket connects a second end of the rail with the lower section.

6. The slide rail locking system of claim 1, wherein the first blocking member and the second blocking member respectively comprise a first guide wall and a second guide wall which face each other and are inclined relative to each other by converging from the second slide rail element towards the first slide rail element, respectively configured to engage with the unlocking member during its deployment to ensure a separation of the first blocking member and of the second blocking member against the return force of the elastic member, with elimination of the first force and of the second force, in the second position of the unlocking member.

7. The slide rail locking system of claim 1, wherein the first brace and/or the second brace are composed of elements separate from the second slide rail element, comprising a mechanism for adjusting the position of the first brace and/or of the second brace on the second slide rail element, along the longitudinal axis of the slide rail.

8. The slide rail locking system of claim 3, wherein the first brace for the first blocking member and the second brace for the second blocking member are braces physically and directly formed by the upper section.

9. The slide rail locking system of claim 3, wherein the first brace for the first blocking member consists of an edge of the upper aperture traversed by the first blocking member and the second brace for the second blocking member consists of an edge of the upper aperture traversed by the second blocking member.

10. The slide rail locking system of claim 1, wherein the elastic member is a shaped strip spring, urged in extension, presenting a first longitudinal end bearing on a bearing surface of the first blocking member and a second longitudinal end bearing on a bearing surface of the second blocking member, and a section of intermediate length mainly extending along the longitudinal axis of the slide rail and joining the two ends consisting of the first longitudinal end and the second longitudinal end, the first longitudinal end and the second longitudinal end being oriented towards each other.

11. The slide rail locking system of claim 1, wherein the slide rail extends in length along a direction X, transversely along a direction Y, and in height along a direction Z, from bottom to top, and wherein the first blocking member and the second blocking member extend substantially along direction Z:

the areas where the forces generated by the elastic member are exerted on the first blocking member and on the second blocking member are arranged, along direction Z, below the first upper surface of the rail, the areas where the forces generated by the unlocking member are exerted on the first blocking member and on the second blocking member are arranged, along direction Z, below the first upper surface of the rail, the first brace generating the first force and the second brace generating the second force which ensure the bracing of the first blocking member and second blocking member, are arranged, along direction Z, above the first upper surface of the rail.

12. A motor vehicle seat comprising a seating portion and a backrest as well as the slide rail locking system of claim 1, wherein the first slide rail element is anchored to the floor of the vehicle and the second slide rail element is integral with a frame of the seating portion.

* * * * *